United States Patent Office 3,274,277
Patented Sept. 20, 1966

3,274,277
PREPARATION OF DIPHENYL
Herman S. Bloch, Skokie, Ill., assignor to Universal Oil Products Company, Des Plaines, Ill., a corporation of Delaware
No Drawing. Filed Sept. 28, 1964, Ser. No. 399,825
17 Claims. (Cl. 260—670)

This invention relates to a novel process for converting benzene to its diaryl derivative, diphenyl, and further relates to a novel process for converting certain other aromatic hydrocarbons to their corresponding diaryl derivatives.

Diphenyl, being one of the most thermally stable of known organic compounds, is employed as a heat-transfer fluid, either alone or as a eutectic mixture with diphenyl oxide. Chemically, diphenyl resembles benzene and can be halogenated, nitrated, sulfonated, hydrogenated, etc., to yield compounds useful in themselves or as chemical intermediates in the preparation of useful compounds.

Diphenyl is produced on a commercial scale by thermal dehydrogenation of benzene, for example, by passing benzene vapors through an iron tube packed with pumice at temperatures ranging from 700 to 850° C. The tendency of benzene to decompose at temperatures in excess of about 650° C. to give carbon and heavy tar deposits on reactor and heat exchange equipment presents a serious problem. Unlike many other well-known dehydrogenation reactions which may be effected at a reduced temperature in the presence of a catalyst, dehydrogenation of benzene to form diphenyl has been relatively insensitive to catalysts.

It is an object of this invention to present a novel process for converting an aromatic hydrocarbon to its diaryl derivative. It is a more specific object of this invention to effect the conversion of benzene to diphenyl at a reduced temperature in the presence of a novel catalyst with respect thereto.

In one of its broad aspects this invention concerns a process for preparing a diaryl derivative of an aromatic hydrocarbon which comprises heating the aromatic hydrocarbon together with ethylene and a strongly alkaline catalyst at a temperature of from about 125° C. to about 200° C., said aromatic hydrocarbon being devoid of alkyl substituents containing an alpha hydrogen.

One of the specific embodiments of this invention relates to a process for the preparation of diphenyl which comprises heating benzene together with ethylene and a strongly alkaline catalyst comprising elemental sodium disposed on activated alumina at a temperature of from about 130° C. to about 165° C.

Other objects and embodiments of this invention will become apparent in the following detailed specification.

Diaryl derivatives of aromatic hydrocarbons can be prepared in accordance with the process of this invention provided that the aromatic hydrocarbon starting material contains no alpha-hydrogen-containing alkyl substituents. Thus, diphenyl can be prepared from benzene, dinaphthyl can be prepared from naphthalene and bis-t-butylphenyl can be prepared from t-butylbenzene. Other aromatic hydrocarbons which can be coupled pursuant to the present process to form the corresponding diaryl hydrocarbons include di-t-butylbenzene, t-amylbenzene, di-t-amylbenzene, and higher homologs thereof, also anthracene, phenanthrene and the like. It is also within the scope of this invention to couple dissimilar aromatic hydrocarbons, for example, benzene and naphthalene, benzene and t-butylbenzene, etc., provided that neither of the aromatic hydrocarbons contain alpha-hydrogen-containing alkyl substituents as aforesaid.

Pursuant to the present process, the aromatic hydrocarbon starting material is heated together with ethylene and an alkaline catalyst. At the reaction conditions herein employed, and in the presence of the aromatic hydrocarbon starting material, the ethylene appears to function as a hydrogen acceptor or as a free radical generator, with little if any formation of ethylene polymer. This is in contrast to the case, for example, where the aromatic hydrocarbon is replaced with heptane, in which case the products are chiefly ethylene polymers. Ethylene polymerization is minimized if not obviated by utilizing the benzene, or other aromatic hydrocarbon starting material, in a molar excess with respect to the ethylene, a molar excess of from about 1.5 to 1 to about 5 to 1 being suitable.

The strongly alkaline catalysts of this invention are those alkaline materials capable of forming an organic carbanion with ethylene. For example, the alkali metals and alkaline earth metals as well as their alkoxides, amides, oxides, hydroxides, carbonates, phosphates, borates and the like are alkaline materials capable of forming organic carbanions with ethylene. Thus, the strongly alkaline catalysts may comprise lithium, sodium, potassium, rubidium, cesium, beryllium, magnesium, calcium, strontium, barium, lithium amide, lithium oxide, lithium hydroxide, lithium carbonate, lithium phosphate, lithium borate, sodium methoxide, sodamide, sodium oxide, sodium hydroxide, sodium carbonate, sodium phosphate, sodium borate, potassium methoxide, potassium amide, potassium oxide, potassium hydroxide, potassium carbonate, potassium phosphate, potassium borate, rubidium oxide, rubidium hydroxide, rubidium carbonate, cesium oxide, cesium hydroxide, cesium carbonate, beryllium oxide, beryllium hydroxide, beryllium carbonate, magnesium oxide, magnesium hydroxide, magnesium carbonate, magnesium phosphate, calcium oxide, calcium carbonate, strontium oxide, barium oxide, barium carbonate, etc., disposed on a high surface area support.

High surface area supports are those with a surface area of from about 25 to about 600 square meters per gram as determined by surface adsorption techniques. Suitable high surface area supports include certain naturally occurring materials, for example clays and silicates such as fuller's earth, Attapulgus clay, feldspar, montmorillonite, haloysite, kaolin and diatomaceous earth, frequently referred to a siliceous earth, diatomaceous silicate, kieselguhr, etc. Naturally occurring aluminas like bauxite, diaspore, gibbsite, etc., preferably activated by acid treatment or other suitable means may also be utilized. The synthetically prepared refractory metal oxides such as silica, alumina, zirconia, thoria, boria, etc., or the various combinations thereof like silica-alumina, alumina-zirconia, etc., can also be utilized.

A synthetically prepared activated alumina is one preferred high surface area support. The preparation of synthetic aluminas is well known in the art. For example, an alkaline reagent, such as ammonium hydroxide, is commingled with an acidic solution of an aluminum salt, such as an aqueous solution of aluminum chloride, to precipitate an alumina gel, or an acid, such as hydrochloric acid, is commingled with a suitable aluminum salt, such as sodium aluminate. In any case, the resulting alumina gel is water-washed to remove soluble salts, dried, formed into particles of the desired size and shape and calcined to form a highly porous material, usually at a temperature of at least about 500° C.

Suitable high surface area supports also include the various charcoals produced by the destructive distillation of wood, peat, lignite, nut shells, bones and other carbonaceous matter, and especially such charcoals as have been heat treated and/or chemically treated to form a highly porous material generally described as activated carbon or charcoal and usually containing a surface area of from about 200 to about 600 square meters per gram.

The alkaline materials herein disclosed may be disposed on the high surface area support by conventional or otherwise convenient methods and may comprise from 2 to 25% or more by weight of the final catalyst composite. For example, one of the preferred alkaline materials is potassium amide. Potassium amide may be disposed on the selected support by initially dissolving a sufficient quantity of potassium in an excess of liquid ammonia and allowing the mixture to react until the blue color has been discharged. The support is thereafter immersed in the ammoniacal solution and potassium amide, resulting from the reaction of the potassium and ammonia, is sorbed thereon. The excess ammonia is then driven off and the catalyst is ready for use. Other preferred catalysts include alkali metals, particularly sodium and potassium, on a high surface area support. One suitable method of preparing such catalysts comprises immersing the selected support in the molten metal, usually maintained at a temperature of from about 10° C. to about 20° C. in excess of its melting point, in a nitrogen atmosphere. The support is stirred or otherwise agitated in contact with the molten metal to achieve a uniform distribution of the metal on the surface of the support.

The process of this invention is particularly adapted to a continuous operation although batch methods may be employed. The continuous type of operation may embody a fixed bed operation, or a compact moving bed type of operation in which the bed of catalyst and the reactants pass either concurrently or countercurrently to each other in the reaction zone, or a slurry type of operation in which the catalyst is carried into the reaction zone as a slurry in the charge to the reactor. A continuous type of operation utilizing a fixed bed is preferred. The catalyst is disposed in a fixed bed in a reaction zone of a suitable reactor, the reaction zone being maintained at the proper operating conditions of temperature and pressure while the ethylene and aromatic hydrocarbon starting materials are charged therethrough. The aromatic hydrocarbon feed stock may be charged to the reactor at a liquid hourly space velocity of from about 0.1 to about 20 or more, together with the ethylene feed, passing upwardly or downwardly through the catalyst bed. A liquid hourly space velocity in the lower range of from about 0.1 to about 10 is preferred. The reactor effluent is recovered in a high pressure separator wherein the gaseous (ethylene) and the liquid phases are separated. Any excess ethylene is recovered for recycle as a portion of the reactor feed. The liquid phase, comprising unreacted aromatic hydrocarbon and the diaryl product, is distilled and unreacted aromatic hydrocarbon recycled to the reactor to be ultimately converted to the desired diaryl product.

Temperatures required to carry out the process of this invention are considerably less than presently employed in commercial processes. A relatively low temperature in the range of from about 125° C. to about 200° C. may be utilized, a temperature of from about 130° C. to about 175° C. being preferred. The process is effected at an elevated pressure sufficient to maintain at least a substantial portion of the reactants in the liquid phase, a pressure of from about 800 to about 1200 pounds per square inch usually being adequate for this purpose.

The following examples are presented in illustration of specific embodiments of this invention and are not intended to serve as an undue limitation on the generally broad scope of this invention as set out in the appended claims.

*Example I*

A catalyst comprising potassium on an alumina support was prepared as follows. About 100 cubic centimeters of high surface area alumina spheres (about 200 square meters of surface area per gram of alumina) were treated with a lithium hydroxide solution to deposit about 0.5 weight percent lithium hydroxide on the alumina. The spheres were dried in a rotary steam drier and calcined at 550° C. for 3 hours. Thereafter, the alumina spheres were placed in a 300 cubic centimeter capacity rotating vessel and maintained therein under a flow of dry nitrogen. Potassium metal was added to the vessel in two increments. The vessel was rotated and heated after the first increment was added until the potassium started to melt, the temperature continuing upwardly to a miximum of about 98° C. Thereafter, the vessel was cooled and the second increment of potassium was added thereto. Heat was applied to the rotating vessel until the potassium metal began to melt and the temperature reached a maximum of 88° C. The vessel was then cooled and flushed with dry nitrogen. The catalyst was analyzed and found to contain 20.1 weight percent potassium.

The catalyst thus prepared was loaded into a vertical tubular reactor under a dry nitrogen flow and sealed therein. Benzene and ethylene were then charged to the reactor in about a 4 to 1 mol ratio, the charge being introduced at a liquid hourly space velocity of approximately 1.4. The reactor was maintained at a temperature of about 155° C. and at a pressure of 1200 pounds per square inch. The reactor effluent was passed to a high pressure separator maintained at about 75° C. and separated into a gaseous and a liquid phase. The gaseous phase was recovered and measured through a wet test meter. A liquid phase was recovered and fractionated. Approximately 65% of the liquid phase boiled at 223–275° C. Analysis of this fraction disclosed about 60% diphenyl. Analysis of the gaseous phase indicated about 20% conversion of the ethylene charge.

*Example II*

A catalyst comprising sodium metal on a high surface supporting material was prepared by placing about 100 cubic centimeters of alumina spheres (about 200 square meters of surface area per gram) in a rotating vessel of about 300 cubic centimeters capacity. The vessel was flushed with dry nitrogen and the alumina was maintained in a dry nitrogen atmosphere. Metallic sodium was added to the vessel in two increments. The vessel was rotated and heat was applied until the sodium melted. After the sodium appeared to be evenly distributed on the alumina the vessel was cooled and the second increment of sodium was added thereto. The vessel was reheated until the sodium melted and rotated until a uniform distribution of the sodium on the spheres was obtained. The vessel was then cooled to about room temperature and the catalyst maintained in a dry nitrogen atmosphere until loaded in the reactor. The catalyst was analyzed and found to contain 20 weight percent sodium.

The catalyst thus prepared was loaded into a vertical tubular reactor under nitrogen and sealed therein. Benzene and ethylene were then charged to the reactor in about a 4 to 1 mol ratio, the charge being introduced at a liquid hourly space velocity of approximately 1.35. The reactor was maintained at a temperature of about 135° C. and at a pressure of 1200 pounds per square inch. The reactor effluent was passed to a high pressure separator maintained at about room temperature and separated into a gaseous and a liquid phase. The gaseous phase was recovered and measured through a wet test meter. The liquid phase was recovered and fractionated. Approximately 45% of the liquid phase boiled in the range of 210–270° C. Analysis of this fraction disclosed about 40% diphenyl and 30% triethylbenzene. Analysis of the gaseous phase indicated about a 20% conversion of the ethylene charge.

*Example III*

A catalyst comprising potassium amide disposed on an alumina support was prepared in the following manner. Approximately 100 cubic centimeters of high surface area alumina spheres (about 200 square meters of surface area per gram of alumina) were treated with a lithium hydroxide solution to deposit about 0.5 weight percent lithium hydroxide on the alumina. The spheres were then dried in a rotary steam drier and calcined at 550° C.

for 3 hours. Thereafter, the alumina spheres were placed in a 300 cubic centimeter capacity rotating vessel and maintained under a flow of dry nitrogen. Potassium metal was added to the vessel in two increments. The vessel was rotated and heated after the first increment was added until the potassium started to melt, the temperature continuing upwardly to a maximum of about 98° C. Thereafter, the vessel was cooled and the second increment of potassium added thereto. Heat was applied to the rotating vessel until the potassium metal began to melt, the temperature reaching a maximum of 88° C. The vessel was then cooled to about 32° C. and gaseous ammonia was charged thereto for about a one hour period. The temperature of the vessel increased during the ammonia addition. After the ammonia treatment the vessel was flushed with dry nitrogen. The catalyst was analyzed and found to contain potassium amide, the potassium content being 15 weight percent calculated as potassium amide.

The catalyst thus prepared was loaded into a vertical tubular reactor under a dry nitrogen flow and sealed therein. Benzene and ethylene were then charged to the reactor in about a 4 to 1 mol ratio, the charge being introduced at a liquid hourly space velocity of approximately 1.0. The reactor was maintained at a temperature of about 135° C. and at a pressure of about 1200 pounds per square inch. The reactor effluent was passed to a high pressure separator maintained at room temperature and separated into a gaseous and a liquid phase. The gaseous phase was recovered and measured through a wet test meter. The liquid phase was recovered and fractionated. Approximately 45% of the liquid phase boiled in the range of 202–275° C. Analysis of this fraction disclosed about 8% diphenyl, 51% diethylbenzene and 38% triethylbenzene. Analysis of the gaseous phase indicated about 47% conversion of the ethylene charge.

*Example IV*

A catalyst comprising sodium on an alumina support of about 200 square meters per gram surface area prepared in accordance with the method of Example II is utilized in the preparation of bis-t-butylphenyl. Tertiary butylbenzene and ethylene are combined in a mol ratio of about 4 to 1 and charged to a reactor containing the described catalyst disposed in a fixed bed therein. The t-butylbenzene-ethylene feed stock is charged at a liquid hourly space velocity of about 1.0. The reactor is maintained at a pressure of approximately 1200 pounds per square inch and the catalyst bed at a temperature of 135° C. The reactor effluent is collected in a high pressure separator at a temperature of about 95° C. and pressure of about 500 pounds per square inch. Unreacted ethylene is recovered from the separator as a gaseous phase, the liquid phase being recovered and distilled to separate unreacted t-butylbenzene therefrom. The higher boiling product is further distilled at reduced pressure to recover the bis-t-butylphenyl fraction.

*Example V*

Potassium disposed on an alumina support with a surface area of about 200 square meters per gram and prepared in accordance with the method of Example I is utilized in the preparation of binaphthyl. The naphthalene and ethylene starting materials are combined and charged to a reactor containing the described catalyst in a fixed bed therein. The naphthalene-ethylene charge is charged to the reactor at a liquid hourly space velocity of about 1.0, the charge consisting of a 4 to 1 mol ratio of naphthalene to ethylene. The reactor is maintained at a pressure of 1200 pounds per square inch and a temperature of 135° C. The reactor effluent is received in a high pressure separator at a temperature of 95° C. and at a pressure of 500 p.s.i. Unreacted ethylene is recovered therefrom as the gaseous phase, the liquid phase being recovered and fractionated at reduced pressure to yield unreacted naphthalene and a residue from which a mixture of the desired binaphthyls is recovered by crystallization.

I claim as my invention:

1. A process for preparing a diaryl derivative of an aromatic hydrocarbon which comprises heating the aromatic hydrocarbon together with ethylene and an alkaline-acting catalyst comprising a metal selected from the group consisting of alkali metals and alkaline earth metals on a high surface area support at a temperature of from about 125° C. to about 200° C., said aromatic hydrocarbon being devoid of alkyl substituents containing an alpha hydrogen.

2. The process of claim 1 further characterized in that said alkaline-acting catalyst comprises an alkali metal on a high surface area support.

3. The process of claim 2 further characterized in that said alkali metal is sodium on a high surface area support.

4. The process of claim 2 further characterized in that said alkali metal is potassium on a high surface area support.

5. The process of claim 3 further characterized in that said high surface area support is activated alumina.

6. The process of claim 4 further characterized in that said high surface area support is activated alumina.

7. A process for preparing a diaryl derivative of a benzene hydrocarbon which comprises heating the benzene hydrocarbon together with ethylene and an alkaline-acting catalyst comprising a metal selected from the group consisting of alkali metals and alkaline earth metals on a high surface area support at a temperature of from about 125° C. to about 200° C., said benzene hydrocarbon being devoid of alkyl substituents containing an alpha hydrogen.

8. The process of claim 7 further characterized in that said alkaline-acting catalyst comprises an alkali metal on a high surface area support.

9. The process of claim 8 further characterized in that said alkali metal is sodium on a high surface area support.

10. The process of claim 8 further characterized in that said alkali metal is potassium on a high surface area support.

11. The process of claim 9 further characterized in that said high surface area support is activated alumina.

12. The process of claim 10 further characterized in that said high surface area support is activated alumina.

13. A process for preparing diphenyl which comprises heating benzene together with ethylene and an alkaline-acting catalyst comprising elemental sodium disposed on activated alumina at a temperature of from about 130° C. to about 165° C.

14. A process for preparing diphenyl which comprises heating benzene together with ethylene and an alkaline-acting catalyst comprising elemental potassium disposed on activated alumina at a temperature of from about 130° C. to about 165° C.

15. A process for preparing diphenyl which comprises heating benzene together with ethylene and an alkaline-acting catalyst comprising potassium amide disposed on activated alumina at a temperature of from about 130° C. to about 165° C.

16. A process for preparing bis-t-butylphenyl which comprises heating t-butylbenzene together with ethylene and an alkaline-acting catalyst comprising elemental potassium disposed on activated alumina at a temperature of from about 130° C. to about 165° C.

17. A process for preparing dinaphthyl which comprises heating naphthalene together with ethylene and an alkaline-acting catalyst comprising elemental potassium disposed on activated alumina at a temperature of from about 130° C. to about 165° C.

No references cited.

DELBERT E. GANTZ, *Primary Examiner.*

G. E. SCHMITKONS, *Assistant Examiner.*